United States Patent [19]

Gorelik et al.

[11] 4,374,180

[45] Feb. 15, 1983

[54] METHOD FOR MODIFICATION OF THE SURFACE OF INDUSTRIAL RUBBER ARTICLES

[76] Inventors: Rudolf A. Gorelik, ulitsa Sumskaya, 6, korpus 4, kv. 2; Evgeny A. Dukhovskoi, prospekt Vernadskogo, 127, kv. 467; Alexandr M. Kleiman, naberezhnaya M.Gorkogo, 40/42, kv. 244; Nikolai A. Kleimenov, Leninsky prospekt, 57, kv. 125; Andrei M. Markevich, ulitsa Vavilova, 55/7, kv. 15, all of Moscow; Ardalion N. Ponomarev, ulitsa Tretia, 2, kv. 3, Moskovskaya oblast, Noginsky raion, p/o Chernogolovka; Askold A. Silin, prospekt Vernadskogo, 93, kv. 95, Moscow; Valentina M. Skok, prospekt Vernadskogo, 93, kv. 94, Moscow; Viktor L. Talroze, Vorobievskoe shosse, 11, kv. 21, Moscow; Anatoly V. Khomyakov, ulitsa Studencheskaya, 30, stroenie 2, kv. 2, Moscow; Andrei Y. Lyapunov, ulitsa Dmitria Ulyanova, 1/61, kv. 141, Moscow, all of U.S.S.R.

[21] Appl. No.: 190,798

[22] Filed: Sep. 25, 1980

[30] Foreign Application Priority Data

Sep. 25, 1979 [SU] U.S.S.R. .............................. 2810498

[51] Int. Cl.$^3$ .............................................. B05D 3/06
[52] U.S. Cl. ........................................ 428/421; 427/41
[58] Field of Search ...................... 427/38, 39, 40, 41; 428/421

[56] References Cited

U.S. PATENT DOCUMENTS

| 3,068,510 | 12/1962 | Coleman | 204/165 |
| 3,617,354 | 11/1971 | Carnahan | 427/41 |
| 3,632,400 | 1/1972 | Burlant | 428/421 |
| 3,669,885 | 6/1972 | Wright et al. | 204/168 |
| 4,188,426 | 2/1980 | Auerbach | 427/41 |

*Primary Examiner*—John H. Newsome
*Attorney, Agent, or Firm*—Lilling & Greenspan

[57] ABSTRACT

A method for modification of the surface of industrial rubber articles involving treatment of these articles with ionizing radiation in the form of an electric glow discharge and applying a polymer layer onto their surface by admitting into a chamber vapors of esters of methacrylic acid or acrylic acid, and fluorinated alcohol simultaneously with the rubber articles being treated in the electric glow discharge. This method of modifying of the surface of industrial rubber goods makes it possible to reduce the coefficient of friction of articles made by the aforesaid method, from 2 to 10 times depending on the nature of the rubber, increase productivity of machines and apparatus, and prolong the service life of packing assemblies of automobile units.

6 Claims, No Drawings

METHOD FOR MODIFICATION OF THE SURFACE OF INDUSTRIAL RUBBER ARTICLES

FIELD OF THE INVENTION

The present invention relates to the production of coatings on the surface of shaped articles of high-molecular compounds and, more specifically, to methods for modifying the surface of industrial rubber articles.

The present invention is useful in the rubber industry for the manufacture of rubber-engineering goods featuring a low friction coefficient and increased wear-resistance.

Modified rubber articles can be used in stationary and mobile structures of a wide range of machines and apparatus, bearings and other friction units. The low friction and chemical inactivity of the working surface of modified industrial rubber goods totally eliminates adherence of rubber to metal in air, vacuum and water.

In mechanical control systems the use of such industrial rubber articles makes it possible to substantially improve the reliability and sensitivity of such systems.

The modified industrial rubber goods can also be useful in the medical industry.

BACKGROUND OF THE INVENTION

Known in the art are methods for modifying the surface of rubber industrial articles by irradiation (cf. U.S. Pat. No. 3,142,754 Cl. 250-52, 1964; British Pat. No. 1,120,803 Cl. C3E, 1965). These methods provide for improved physico-mechanical characteristics of rubber articles due to the formation of a modified layer on their surface possessing higher adhesion properties compared to those of the non-treated rubber article surface.

However, the antifriction properties of rubber are only insignificantly varied.

The closest prior art appears to be a method for modifying the surface of rubber industrial articles involving treating of the articles with ionizing radiation and applying a polymer layer onto the surface thereof (cf. British Pat. No. 1,120,803 Cl. C3E, 1965).

However, this method does not provide the required level of improvement of antifriction properties of the materials, i.e., the coefficient of friction.

SUMMARY OF THE INVENTION

It is an object of the present invention to provide a method for modifying the surface of industrial rubber articles which would make it possible to reduce the coefficient of friction of the articles.

This object is accomplished by a method for modifying the surface of industrial rubber goods involving treatment thereof by means of ionizing irradiation and application of a polymer layer on the surface of the articles. In accordance with the present invention the ionizing radiation in the form of an electric glow discharge is created in a vacuum chamber, whereinto industrial rubber goods are preliminarily placed and air is evacuated therefrom to a residual pressure of below 1 Pa. The polymer layer is applied onto the surface of the industrial rubber articles by admitting into the chamber, vapors of methacrylic acid or acrylic acid ester and fluorinated alcohol to a pressure inside said chamber of from 10 to 10,000 Pa, simultaneously with the treatment of the industrial rubber articles in the electric glow discharge for a period of from 0.5 to 2 hours.

The present invention makes it possible to produce industrial rubber articles with a unique, for rubber, friction coefficient without changing the formulation of the starting materials and procedure of manufacturing the starting rubber articles. This enables a considerable increase in the operability of machines and apparatus, for example, a substantially longer service life of packing assemblies of automobile units.

DETAILED DESCRIPTION OF THE INVENTION

The method of modification of the surface of industrial rubber goods involves treatment of these articles with ionizing radiation and application of a polymer layer onto their surface. An article is placed into a vacuum chamber, wherefrom air is evacuated to a residual pressure of below 1 Pa and an electric glow is ignited therein by applying voltage to the electrodes positioned in the chamber. Under the effect of the electric glow discharge on the surface of industrial rubber articles there occurs the formation of active centers: free radicals and free valences.

Then, without interrupting the electric glow discharge, onto the surface of the rubber articles a polymer layer is applied by way of admitting into the chamber, vapors of methacrylic acid or acrylic acid ester and fluorinated alcohol to a pressure in the chamber of from 10 to 10,000 Pa. Under a pressure in the chamber of below 10 Pa the efficiency of modification of the article surface is very low. Increasing pressure of the vapors above 10,000 Pa causes extinction of the electric glow discharge in the chamber.

In the zone of the electric glow discharge there occurs the dissociation of molecules of the ester and the fluorinated alcohol. The fragments of their molecules are polymerized on the active centers of the rubber surface and therebetween, thus forming a solid lubricating boundary film chemically bonded to the rubber. It improves antifriction properties of the industrial rubber goods, i.e. lowers the coefficient of friction of the rubber articles.

The treatment in the electric glow discharge is conducted for a period of from 0.5 to 2 hours.

The treatment duration below 0.5 hour results in an impaired efficiency of the modification, whereas treatment in excess of two hours is unreasonable, since it does not result in the variation of the attained level of antifriction properties of the surface of the industrial rubber articles.

In accordance with the present invention, modification of the surface of rubber articles is based on ethylene-propylene ternary rubber, fluorosiloxane, butadiene-nitrile and fluorinated rubbers.

The esters of acrylic acid or methacrylic acid and fluorinated alcohol used according to the present invention have the following general formula:

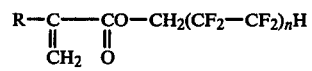

wherein n is 1 to 4; R=CH$_3$; H.

The present invention is further illustrated by the following specific Examples.

EXAMPLE 1

Subjected to modification according to the present invention is the surface of rubber-engineering articles in the form of samples of vulcanized rubber based on butadiene-nitrile rubber with a size of 150×150×2 mm.

The samples are placed into a vacuum chamber. Then the chamber is evacuated to a residual pressure of 0.1 Pa and an electric glow discharge is ignited in the chamber by applying voltage to the electrodes positioned in the chamber until a visible glow appears in the chamber. Then, without switching-off the glow discharge, into the chamber there are supplied vapors of an ester of acrylic acid and a fluorinated alcohol (n=1) to the pressure of 10 Pa. To eliminate the presence of oxygen hindering further polymerization of the ester molecules, air should be preliminary evacuated from the chamber to a pressure of below 1 Pa. In this Example the pressure is equal to 0.1 Pa.

The glow-discharge treatment is conducted for two hours. Afterwards, the modified industrial rubber articles are withdrawn from the chamber.

The friction coefficient of the thus-treated articles is reduced by two times.

EXAMPLE 2

In accordance with the method for modification of the surface of rubber articles according to the present invention the surface of vulcanized rubber samples based on butadiene-nitrile rubber with the size of 150×150×2 mm are modified.

The samples are placed into a vacuum chamber. Then air is evacuated from the chamber to a residual pressure of 0.1 Pa. and an ionizing radiation is created therein in the form of a glow electric discharge.

Then into the chamber there are supplied vapors of an ester of acrylic acid and a fluorinated alcohol (n=2) to a pressure of 10 Pa and simultaneously the treatment of the rubber articles is effected in an electric glow discharge. The electric glow-discharge treatment is conducted for two hours, whereafter the modified rubber article is extracted from the chamber. The friction coefficient is reduced by 3 times.

EXAMPLE 3

In accordance with the method for modification of the surface according to the present invention the surface of vulcanized rubber samples based on butadiene-nitrile rubber with the size of 150×150×2 mm is subjected to modification.

The samples are placed into a vacuum chamber. The chamber air is evacuated to a residual pressure of 0.1 Pa and an ionizing radiation is created therein by applying voltage to the electrodes disposed in the chamber until a visible glow appears in the chamber.

Afterwards, into the chamber there are introduced vapors of an ester of acrylic acid and a fluorinated alcohol (n=4) to a pressure in the chamber of 10 Pa and simultaneously the samples are treated in the electric glow discharge. In order to eliminate the presence, in the chamber, of oxygen hindering a further process of polymerization of the ester molecules, air should be preliminary evacuated from the chamber to a residual pressure of below 1 Pa. In this Example the pressure employed is 0.1 Pa. The treatment in the electric glow discharge is conducted for two hours. Then the article is withdrawn from the chamber. The coefficient of friction of the thus-treated articles is reduced by 5 times.

EXAMPLE 4

In accordance with the method of the present invention for surface modification, the surface of vulcanized rubber samples based on butadiene-nitrile rubber with the size of 150×150×2 mm is subjected to modification.

The samples are placed into a vacuum chamber. From the chamber air is evacuated to a residual pressure of 0.5 Pa and an ionizing radiation is created therein in the form of an electric glow discharge by way of applying voltage to the electrodes provided in the chamber until a visible glow appears therein.

Afterwards, vapors of an ester of methacrylic acid and fluorinated alcohol with n=4 at a pressure of 100 Pa are supplied into the chamber and simultaneously the treatment of rubber articles is conducted in the electric glow discharge. In order to eliminate the presence of oxygen hindering the further polymerization of the ester molecules, air from the chamber should be preliminarily evacuated to a pressure of below 1 Pa. The treatment in the electric glow discharge is conducted for 1 hour. Then the article is withdrawn from the chamber. The friction coefficient of the thus-treated articles is reduced by 3 times.

EXAMPLE 5

In accordance with the method for the surface modification according to the present invention, the surface of vulcanized rubber samples based on butadiene-nitrile rubber with the size of 150×150×2 mm is modified.

The samples are placed into a vacuum chamber. Air is evacuated from the chamber to a residual pressure of 0.5 Pa and an ionizing radiation is created therein by applying voltage to the electrodes positioned in the chamber until a visible glow appears therein.

Then the vapors of an ester of acrylic acid and fluorinated alcohols (n=4) are fed into the chamber at a pressure of 1,000 Pa and the treatment of the rubber articles in the electric glow discharge is conducted simultaneously. In order to prevent the presence of oxygen hindering the further polymerization of the ester molecules, air from the chamber should be preliminarily evacuated to a pressure of below 1 Pa. The treatment in the electric glow discharge is effected for 1 hour. Then the article is withdrawn from the chamber. The coefficient of friction of the treated articles is reduced by 5 times.

EXAMPLE 6

Samples of vulcanized rubber based on butadiene-nitrile rubber with the size of 150×150×2 mm are subjected to surface modification in accordance with the present invention.

The samples are placed into a vacuum chamber. Air is then evacuated from the chamber to a residual pressure of 0.5 Pa and an ionizing radiation is created therein in the form of an electric glow discharge by applying voltage onto the electrodes positioned in the chamber until a visible glow is observed therein.

Then vapors of an ester of methacrylate acid and a fluorinated alcohol (n=4) are supplied into the chamber at a pressure of 10,000 Pa and simultaneously the treatment of the rubber articles is conducted in the electric glow discharge. In order to eliminate the presence, in the chamber, of oxygen hindering further polymerization of the ester molecules, air in the chamber should be preliminarily evacuated to a residual pressure of below 1 Pa. The treatment in the glow discharge is conducted for 0.5 hour. Then the article is withdrawn from the chamber. The coefficient of treatment of the thus treated articles is reduced by 5 times.

EXAMPLE 7

In accordance with the method for the surface modification according to the present invention the surface of vulcanized rubber articles in the form of samples based on ternary ethylene-propylene rubber with a size of 150×150×2 mm is modified. The samples are placed into a vacuum chamber, wherefrom air is evacuated to a residual pressure of 0.1 Pa and an ionizing radiation is created in the chamber in the form or an electric glow discharge by way of applying voltage onto the electrodes provided in the chamber until a visible glow appears in the chamber.

Vapors of an ester of methacrylic acid and a fluorinated alcohol (n=4) are supplied to the chamber at a pressure of 10,000 Pa and simultaneously the rubber articles are treated in the glow discharge. In order to eliminate the presence, in the chamber, of oxygen hindering further polymerization of the ester molecules, air should be preliminarily evacuated from the chamber to a pressure of below 1 Pa. In this Example the pressure is 0.1 Pa. The treatment in the electric glow discharge is conducted for 0.5 hours, whereafter the article is withdrawn from the chamber. The coefficient of friction of the thus-treated articles is reduced by 4 times.

EXAMPLE 8

Samples of vulcanized rubber based on fluoro-siloxane rubber with a size of 150×150×2 mm are subjected to surface modification in accordance with the present invention. The samples are placed into a vacuum chamber. Air is then evacuated from the chamber to the residual pressure of 0.1 Pa and ionizing radiation is created in the chamber in the form of an electric glow discharge by way of applying voltage to the electrodes provided in the chamber until a visible glow is observed therein.

Then, vapors of an ester of methacrylic acid and fluorinated alcohol (n=4) at a pressure of 10,000 Pa are introduced into the chamber and simultaneously rubber articles are treated in the electric glow discharge. In order to eliminate the presence of oxygen in the chamber which can hinder further polymerization of the ester molecules, air should be evacuated from the chamber to a residual pressure of below 1 Pa. The treatment of the articles in the electric glow discharge is conducted for 0.5 hour. Then the article is withdrawn from the chamber. The friction coefficient of the thus-treated articles is reduced by 20 times.

EXAMPLE 9

Samples of vulcanized rubber based on fluorinated rubber with a size of 150×250×2 mm are subjected to surface modification in accordance with the present invention. The samples are placed into a vacuum chamber. Air is evacuated from the chamber to a residual pressure of 0.1 Pa and an ionizing radiation is created therein in the form of an electric glow discharge by way of applying voltage onto the electrodes provided in the chamber until the appearance of a visible glow in the chamber.

Then vapors of an ester of acrylic acid and fluorinated alcohol with (n=4) are supplied into the chamber to a pressure of 10,000 Pa and the treatment in the electric glow discharge is conducted simultaneously. To eliminate the presence, in the chamber, of oxygen hindering further polymerization of the ester molecules, air from the chamber should be preliminarily evacuated to a pressure of below 1 Pa. In this Example the pressure is 0.1 Pa. The treatment in the electric glow discharge is conducted for 0.5 hour. The coefficient of friction of the thus-treated articles is reduced by 10 times.

The method of the present invention makes it possible to reduce the friction coefficient of rubber articles from 2 to 10 times depending on the nature of rubber.

What is claimed is:

1. A method for modifying the surface of industrial rubber articles to reduce the coefficient of friction comprising the sequential steps of:

placing said articles into a vacuum chamber and treating them at a residual air pressure below 1 Pa, in the presence of ionizing radiation in the form of an electric glow discharge created in said vacuum chamber; and then contacting the surface of said industrial rubber articles with a polymer layer by admitting into said chamber, vapors of an ester of methacrylic acid or acrylic acid, and a fluorinated alcohol at a pressure in the chamber ranging from 10 to 10,000 Pa simultaneously with the treatment of said articles in said electric glow discharge for a period of about 0.5 to 2 hours.

2. The method of claim 1, wherein the industrial rubber is selected from the group consisting of ethylene-propylene ternary rubber, fluorosiloxane, butadiene-nitrile and fluorinated rubber.

3. The method of claim 1, wherein the ester of acrylic acid or methacrylic acid and fluorinated alcohol corresponds to the formula:

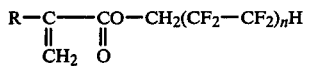

wherein n is 1 to 4; R=CH;hd 3; H.

4. The method of any one of claim 1, 2 or 3, wherein said vapors consist essentially of an ester of methacrylic acid and a fluorinated alcohol.

5. The method of any one of claims 1, 2 or 3, wherein said vapors consist essentially of an ester of acrylic acid and a fluorinated alcohol.

6. The product formed by the method of any one of claims 1, 2 or 3.

* * * * *